US008925846B2

(12) United States Patent
Niitsuma et al.

(10) Patent No.: US 8,925,846 B2
(45) Date of Patent: Jan. 6, 2015

(54) FISHING-REEL REEL UNIT, FISHING REEL AND METHOD OF MANUFACTURING FISHING-REEL REEL UNIT

(75) Inventors: Akira Niitsuma, Osaka (JP); Shouji Nakagawa, Osaka (JP); Hirokazu Hirayama, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 207 days.

(21) Appl. No.: 13/590,863

(22) Filed: Aug. 21, 2012

(65) Prior Publication Data

US 2013/0112795 A1    May 9, 2013

(30) Foreign Application Priority Data

Nov. 8, 2011   (JP) ................. 2011-244151

(51) Int. Cl.
*A01K 89/01*        (2006.01)
*A01K 89/015*       (2006.01)
*A01K 89/00*        (2006.01)

(52) U.S. Cl.
CPC ............. *A01K 89/015* (2013.01); *A01K 89/00* (2013.01); *A01K 89/01* (2013.01)
USPC ........................................ 242/310; 242/321

(58) Field of Classification Search
CPC ...... A01K 89/00; A01K 89/015; A01K 89/01
USPC .......................................... 242/310, 311, 321
See application file for complete search history.

(56) References Cited

U.S. PATENT DOCUMENTS

| | | | |
|---|---|---|---|
| 6,409,113 B1* | 6/2002 | Hirayama et al. | 242/310 |
| 7,370,821 B2* | 5/2008 | Hirayama | 242/319 |
| 7,530,514 B2* | 5/2009 | Kawasaki | 242/310 |
| 7,699,257 B2* | 4/2010 | Takechi et al. | 242/319 |
| 2007/0181728 A1* | 8/2007 | Kawasaki | 242/310 |
| 2008/0173745 A1 | 7/2008 | Takechi et al. | |
| 2009/0127367 A1* | 5/2009 | Tsutsumi | 242/286 |
| 2010/0038464 A1* | 2/2010 | Nakagawa | 242/321 |
| 2010/0187346 A1* | 7/2010 | Ochiai et al. | 242/242 |
| 2011/0180647 A1* | 7/2011 | Niitsuma et al. | 242/307 |

FOREIGN PATENT DOCUMENTS

| | | |
|---|---|---|
| JP | 2000-093054 A | 4/2000 |
| JP | 3066990 B | 5/2000 |
| JP | 2001-299163 A | 10/2001 |
| JP | 2005-270012 A | 10/2005 |

OTHER PUBLICATIONS

Extended European Search Report of the corresponding European Application No. 12190306.6, dated Feb. 21, 2013.

* cited by examiner

*Primary Examiner* — Emmanuel M Marcelo
(74) *Attorney, Agent, or Firm* — Golbal IP Counselors

(57) ABSTRACT

A method of manufacturing a fishing-reel reel unit including a main body member having an opening includes forming the main body member having the opening and a processing reference, accommodating a bearing mounting part in the opening where the bearing mounting part has a bearing opening and an inner peripheral surface, accommodating a bearing in the bearing opening where the bearing is fixedly mounted on the inner peripheral surface, and machining the inner peripheral surface of the bearing mounting part after the bearing is fixedly mounted on the inner peripheral surface, based on the processing reference.

11 Claims, 6 Drawing Sheets

FISHING-REEL REEL UNIT, FISHING REEL AND METHOD OF MANUFACTURING FISHING-REEL REEL UNIT

CROSS-REFERENCE TO RELATED APPLICATIONS

This application claims priority to Japanese Patent Application No. 2011-244151 filed on Nov. 8, 2011. The entire disclosure of Japanese Patent Application No. 2011-244151 is hereby incorporated herein by reference.

BACKGROUND

1. Field of the Invention

The present invention relates to a fishing-reel reel unit, a fishing reel, and a method of manufacturing a fishing-reel reel unit. The present invention is particularly related to a fishing-reel reel unit including a main body member having an opening, a fishing reel including the fishing-reel reel unit, and a method of manufacturing the fishing-reel reel unit

2. Background Art

Fishing reels, which are attached to fishing rods for winding and releasing fishing lines, are mainly classified into spinning reels and dual-bearing reels. A fishing reel of these types normally includes a reel unit, a handle shaft, and a handle assembly. The reel unit is attached to the fishing rod. The handle shaft is rotatably supported by the reel unit. The handle assembly is fixed onto a tip of the handle shaft. The handle shaft thus structured is rotatably supported by the reel unit through a bearing mounted to the inner periphery of an opening formed by machining the reel unit made of metal (see e.g., Japan Patent No. 3,066,990).

In the aforementioned well-known fishing reels, it is required to highly accurately produce an inter-gear clearance (which can be also referred to as a backlash gap) in reducing modules of a drive gear and a pinion gear that serve to transmit rotation of the handle shaft. To highly accurately produce the inter-gear clearance, it is required to highly accurately dispose the handle shaft to which the drive gear is fixed and a spool shaft to which the pinion gear is mounted. Further, to highly accurately dispose the handle shaft and the spool shaft, it is required to highly accurately form the inner peripheries of bearing mounting parts of the reel unit where bearings are respectively mounted for supporting the handle shaft and the spool shaft.

SUMMARY

In the well-known structure, however, the bearing mounting parts made of metal are machined and are then mounted and fixed to the openings of the reel unit. Therefore, it is quite difficult to highly accurately dispose the bearing mounting parts.

A method of manufacturing a fishing-reel reel unit including a main body member having an opening includes forming the main body member having the opening and a processing reference, accommodating a bearing mounting part in the opening where the bearing mounting part has a bearing opening and an inner peripheral surface, accommodating a bearing in the bearing opening where the bearing is fixedly mounted on the inner peripheral surface, and machining the inner peripheral surface of the bearing mounting part after the bearing is fixedly mounted on the inner peripheral surface, based on the processing reference.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
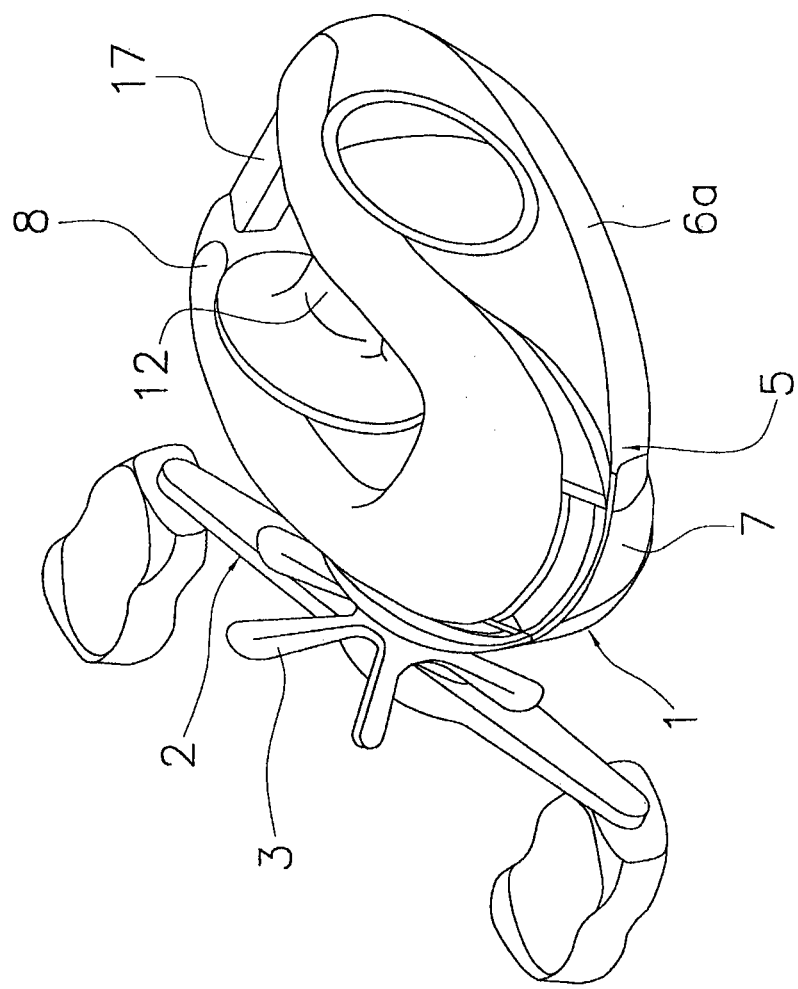
FIG. 1 is a perspective view of a dual-bearing reel employing an exemplary embodiment of the present invention.

As illustrated in FIG. 1, a fishing reel according to an exemplary embodiment of the present invention is a low-profile dual-bearing reel for bait casting. The dual-bearing reel includes a reel unit 1, a handle 2, and a star drag 3. The handle 2, which is used for rotating a spool, is disposed on a lateral side of the reel unit 1. The star drag 3, which is used for regulating drag, is disposed on a reel unit 1 side of the handle 2.

Figure 2:
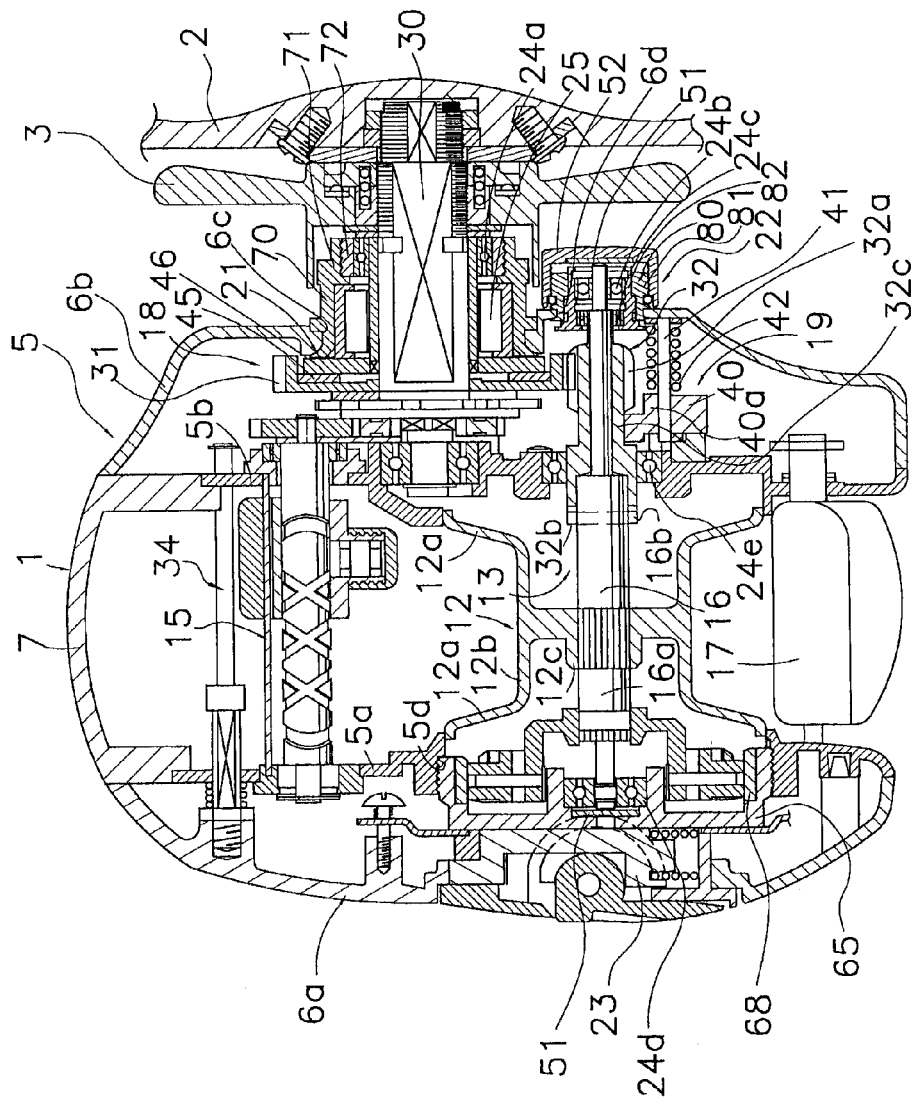
FIG. 2 is a cross-sectional view of the dual-bearing reel.

As illustrated in FIG. 2, the reel unit 1 includes a frame 5, a pair of a first side cover 6a and a second side cover 6b (an exemplary main body member), a first bearing mounting part 70, and a second bearing mounting part 80. The first bearing mounting part 70 includes a first baring opening 100. The second bearing mounting part 80 includes a second baring opening 101. The first and second side covers 6a and 6b are made of aluminum alloy and are attached to the both lateral sides of the frame 5. Each of the first and second side covers 6a and 6b includes a chromium plating layer as a corrosion-resistant film on the surface thereof. As illustrated in FIG. 2, the second side cover 6b includes a first opening 6c and a second opening 6d on the lateral part thereof. The first and second openings 6c and 6d are disposed away from each other at a predetermined interval. The first bearing mounting part 70 is swaged to the first opening 6c, while the second bearing mounting part 80 is swaged to the second opening 6d. As illustrated in FIG. 1, the reel unit 1 further includes a front cover 7 and a thumb rest 8. The front cover 7 covers the front side of the reel unit 1, while the thumb rest 8 covers the top side of the reel unit 1. A spool 12 for winding the fishing line is rotatably and detachably mounted in the inside of the reel unit 1.

The frame 5 includes a pair of a first side plate 5a and a second side plate 5b and a plurality of coupling portions (not illustrated in the figures). The first and second plates 5a and 5b are opposed at a predetermined interval. The plurality of coupling portions couple the first and second side plates 5a and 5b.

As illustrated in FIG. 2, the frame 5 accommodates therein the spool 12, a level winding mechanism 15, and a clutch lever 17. The spool 12 is disposed while the rotary axis thereof is arranged in a direction perpendicular to a fishing rod. The level winding mechanism 15 is configured to uniformly wind the fishing line onto the spool 12. The clutch lever 17 functions as a thumb pad in thumbing the fishing line. The spool 12 can pass through an opening 5d of the first side plate 5a. Further, a gear mechanism 18, a clutch mechanism 13, a clutch engaging/disengaging mechanism 19, a drag mechanism 21, and a casting control mechanism 22 are disposed between the frame 5 and the second side cover 6b. The gear mechanism 18 is configured to transmit rotational force from the handle 2 to the spool 12 and the level winding mechanism 15. The clutch engaging/disengaging mechanism 19 is configured to control and engage/disengage the clutch mechanism 13 in accordance with an operation of the clutch lever 17. The casting control mechanism 22 is configured to regulate resistive force to be caused during rotation of the spool 12. Further, a centrifugal braking mechanism 23 is disposed between the frame 5 and the first side cover 6a for inhibiting occurrence of backlash in casting.

As illustrated in FIG. 2, the spool 12 is formed by cutting magnesium alloy and has a bobbin trunk 12b, a pair of flanges 12a, and a boss 12c. The bobbin trunk 12b is a tubular portion for winding the fishing line about the outer periphery thereof. The flanges 12a protrude radially outwards from the both axial ends of the bobbin trunk 12b. The boss 12c is formed in the inner peripheral part of the bobbin trunk 12b. The inner periphery of the boss 12c is fixed onto a spool shaft 16. The bobbin trunk 12b, the flanges 12a, and the boss 12c are integrally formed by a member made of magnesium alloy. The spool 12 is non-rotatably fixed onto the spool shaft 16, for instance, by serration coupling. The method of fixing the spool 12 onto the spool shaft 16 is not limited to methods using convex and concave (e.g., serration coupling). A variety of coupling methods (bonding, insert molding, etc.) can be used as the method of fixing the spool 12 onto the spool shaft 16.

As illustrated in FIG. 2, the spool shaft 16 is formed in a rod shape by cutting stainless alloy. The spool shaft 16 extends outwards of the second side cover 6b while penetrating through the second side plate 5b. One end (i.e., the extended end) of the spool shaft 16 is rotatably supported by a second bearing 24b mounted to the second bearing mounting part 80 fitted to the second opening 6d formed in the second side cover 6b. On the other hand, the other end of the spool shaft 16 is rotatably supported within the centrifugal braking mechanism 23 through a fourth bearing 24d. The second and fourth bearings 24b and 24d are ball bearings. The right end of a large-diameter portion 16a of the spool shaft 16 is disposed within the penetrated part of the second side plate 5b. An engaging pin 16b, which forms a part of the clutch mechanism 13, is fixed to the right end of the large-diameter portion 16a. The engaging pin 16b penetrates the large-diameter portion 16a along its diameter while the both ends thereof radially protrude therefrom.

As illustrated in FIG. 2, the gear mechanism 18 includes a handle shaft 30, a drive gear 31, and a pinion gear 32. The drive gear 31 is fixed onto the handle shaft 30. The pinion gear 32 is a tubular gear meshing with the drive gear 31. To reduce the height of the thumb rest 8, the vertical position of the handle shaft 30 of the gear mechanism 18 is lower than that in the well-known structure. Therefore, the lower parts of the second side plate 5b and the second side cover 6b, which accommodate the gear mechanism 18, are positioned lower than the lower parts of the first side plate 5a and the first side cover 6a. Further as illustrated in FIG. 2, the handle shaft 30 is rotatably supported by the second side cover 6b through a first bearing 24a mounted to the first bearing mounting part 70 fitted to the first opening 6c formed in the second side cover 6b. As illustrated in FIG. 2, the first bearing 24a is a ball bearing.

Figure 3:
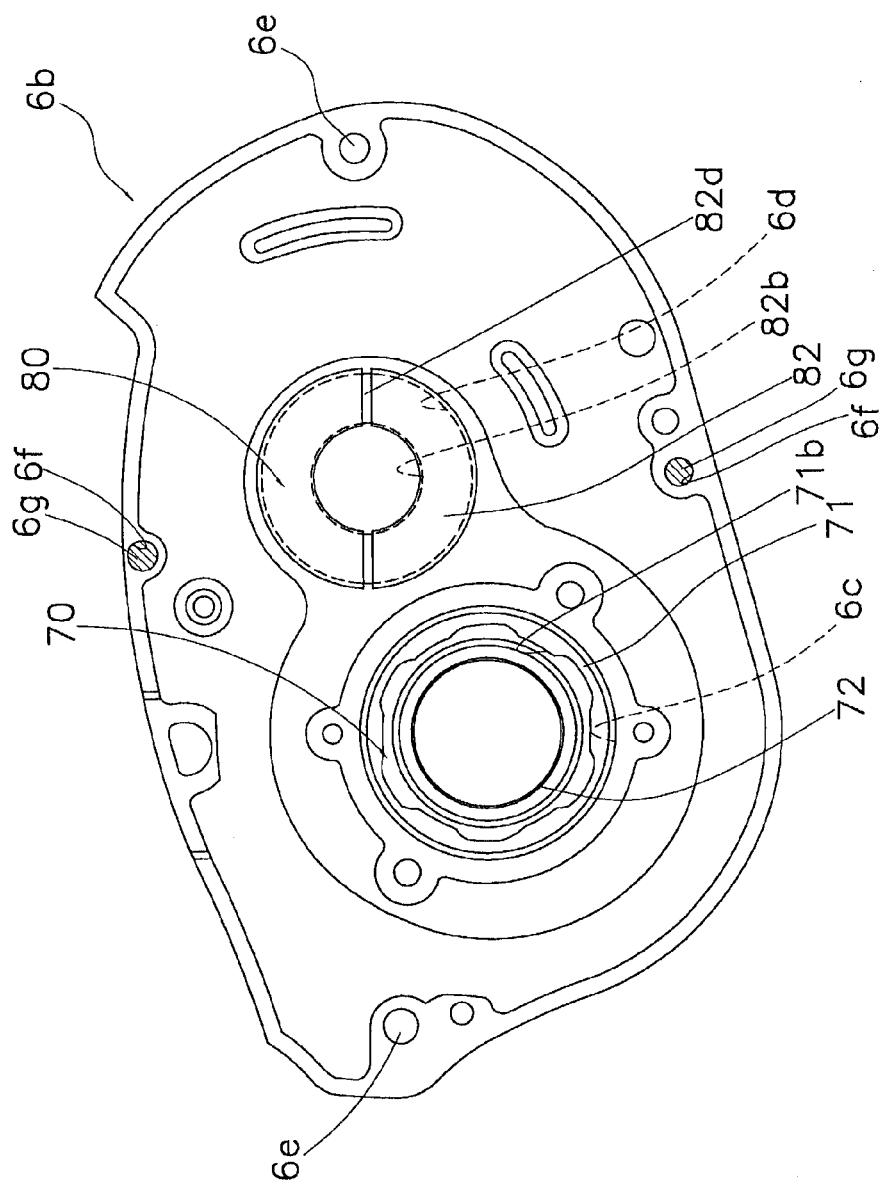
FIG. 3 is a side view of the second side cover seen from its rear side.
Figure 4:
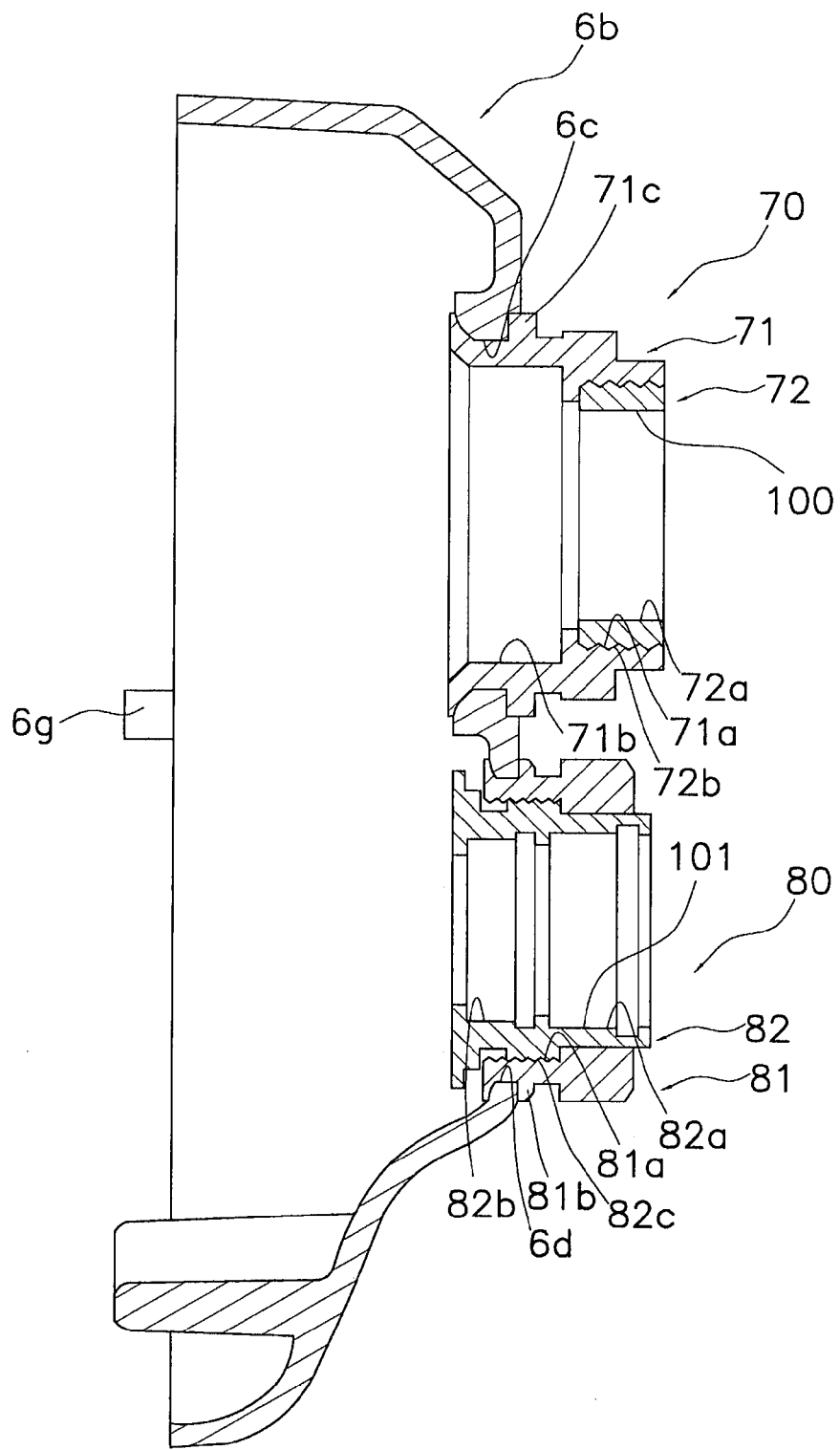
FIG. 4 is a cross-sectional view of a second side cover of the dual-bearing reel

As illustrated in FIGS. 2 to 4, the first bearing mounting part 70 is a tubular member fixed to the second side cover 6b. As illustrated in enlarged views of FIGS. 3 and 4, the first bearing mounting part 70 includes a first outer member 71 and a first inner member 72. The first outer member 71 is a tubular member swaged to the first opening 6c of the second side cover 6b. The first inner member 72 is a tubular member screwed and bonded to the inner periphery of the first outer member 71. As illustrated in FIG. 4, the first inner member 72 has a first inner peripheral surface 72a on the inner periphery thereof. The inner peripheral surface 72a receives the first bearing 24a (see FIG. 2) mounted thereto. The inner peripheral surface 72a is formed by cutting to be executed after the first outer member 71 is swaged to the first opening 6c. As illustrated in FIG. 4, the first inner member 72 has a first male threaded portion 72b on the outer periphery thereof. The first male threaded portion 72b can be screwed into a first female threaded portion 71a formed on the inner periphery of the first outer member 71. As illustrated in FIG. 4, the first outer member 71 has the first female threaded portion 71a and a second inner peripheral surface 71b on the inner periphery thereof. The first female threaded portion 71a is screwed onto the first male threaded portion 72b of the first inner member 72. The second inner peripheral surface 71b is disposed on the left side of the first female threaded portion 71a (see FIG. 4) and receives a one-way clutch 25 (see FIG. 2) to be mounted thereto.

The first inner member 72 is mounted to the inner periphery of the first outer member 71 from the right side in FIG. 4 while the first male threaded portion 72b is screwed into the first female threaded portion 71a. Both of the first female threaded portion 71a and the first male threaded portion 72b are left-handed screws for preventing the first inner member 72 from being loosened in executing a cutting process from the left side in FIG. 4. Further, the first female threaded portion 71a and the first male threaded portion 72b are bonded to each other. On the other hand, the first inner member 72 includes a slot (not illustrated in the figures) on the right end surface thereof. A tool is engaged with the slot for screwing the first inner member 72 into the first outer member 71. Further, the first outer member 71 has a first flanged portion 71c on the outer periphery thereof. The first flanged portion 71c functions as a stopper in fixing the first outer member 71 to the first opening 6c.

The first outer member 71 is made of aluminum alloy and includes an anodized coating as a corrosion-resistant coating on the surface thereof. On the other hand, the first inner member 72 is made of stainless alloy as a corrosion-resistant material. Therefore, it is not required to from an anodized coating as a corrosion-resistant coating on the surface of the first inner member 72.

As illustrated in FIGS. 2 to 4, the second bearing mounting part 80 is a tubular member fixed to the second side cover 6b. As illustrated in enlarged views of FIGS. 3 and 4, the second bearing mounting part 80 includes a second outer member 81 and a second inner member 82. The second outer member 81 is a tubular member swaged to the second opening 6d of the second side cover 6b. The second inner member 82 is a tubular member screwed into and fixed by bonding to the inner periphery of the second outer member 81. As illustrated in FIG. 4, the second outer member 81 has a second female threaded portion 81a and a second flanged portion 81b. The second female threaded portion 81a can be screwed onto a second male threaded portion 82c formed on the outer periphery of the second inner member 82. The second flanged portion 81b is formed on the outer periphery of the second outer member 81 and functions as a stopper in fixing the second outer member 81 to the second opening 6d of the second side cover 6b. The second inner member 82 has a third inner peripheral surface 82a and a fourth inner peripheral surface 82b. The second bearing 24b (see FIG. 2) is mounted to the third inner peripheral surface 82a, whereas a third bearing 24c (see FIG. 2) is mounted to the fourth inner peripheral surface 82b. The third and fourth inner peripheral surfaces 82a and 82b are cut at a processing position equal to that taken in cutting the inner peripheral surface 72a of the first inner member 72.

The second inner member 82 is mounted to the inner periphery of the second outer member 81 from the left side in FIG. 4 while the second male threaded portion 82c is screwed into the second female threaded portion 81a. Similarly to the first female threaded portion 71a and the first male threaded portion 72b, the second female threaded portion 81a and the second male threaded portion 82c are left handed screws and prevent the second inner member 82 from being loosened in executing a cutting process from the left side in FIG. 4. Further, the second female threaded portion 81a and the second male threaded portion 82c are bonded to each other. As illustrated in FIG. 3, the second inner member 82 further has a slot 82d on the left end surface thereof (see FIG. 4). A tool is engaged with the slot 82d for screwing the second inner member 82 into the second outer member 81.

The second outer member 81 is made of aluminum alloy and includes an anodized coating as a corrosion-resistant coating on the surface thereof. The second inner member 82 is made of stainless alloy as a corrosion-resistant material. Therefore, it is not required to form an anodized coating as a corrosion-resistant coating on the surface of the second inner member 82.

Figure 5:
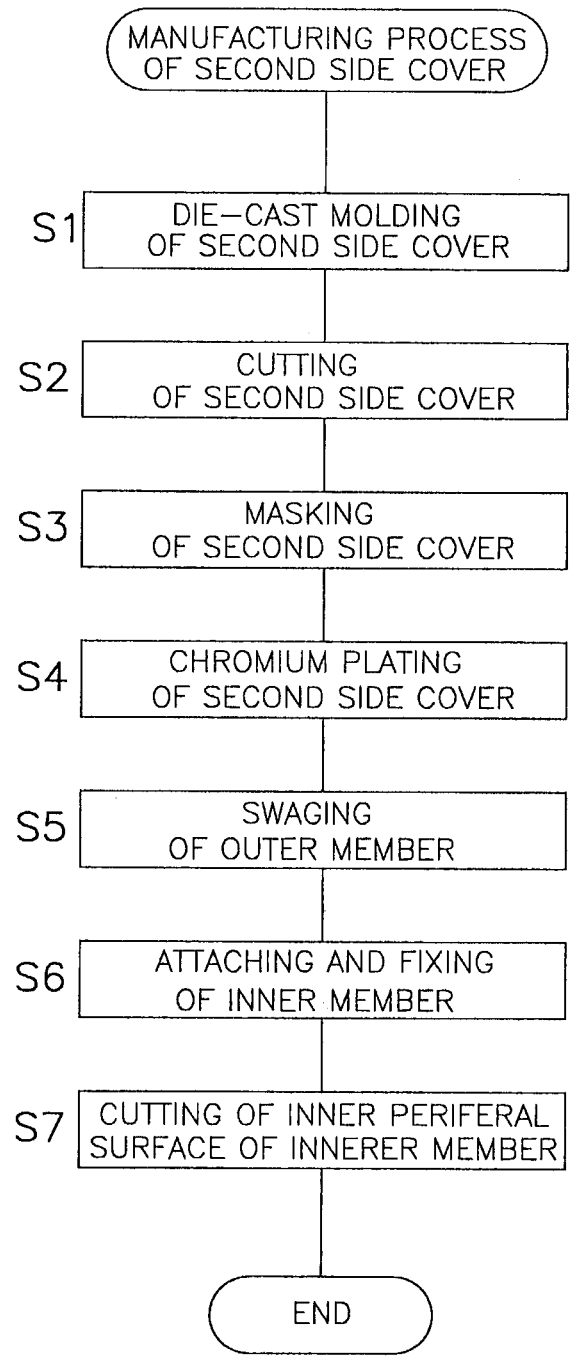
FIG. 5 is a flowchart representing a manufacturing process of the second side cover.

FIG. 5 represents a series of steps of attaching the aforementioned first and second bearing mounting parts 70 and 80 to the second side cover 6b.

First in Step S1, die cast molding of aluminum alloy is executed for forming the second side cover 6b having the first and second openings 6c and 6d.

Next in Step S2, cutting of the second side cover 6b is executed simultaneously for removing burr produced in the molding and for forming elements such as the first and second openings 6c and 6d, two positioning holes 6e for processing references (see FIG. 3) and two recesses 6f (see FIG. 3) receiving two positioning pins 6g (see FIGS. 3 and 4) press-inserted therein for positioning the second side cover 6b in attaching the second side cover 6b to the frame 5.

Next in Step S3, masking of the positioning holes 6e is executed by inserting screws into the positioning holes 6e.

Next in Step S4, a chromium plating layer is formed on the surface of the second side cover 6b by chromium plating.

Next in Step S5, the first outer member 71 and the second outer member 81, each of which is made of aluminum alloy and includes an anodized coating on the surface thereof, are swaged to the first opening 6c and the second opening 6d of the second side cover 6b, respectively.

Next in Step S6, to form the first and second bearing mounting parts 70 and 80, the first inner member 72 and the second inner member 82 are screwed into and fixed by bonding to the inner periphery of the first outer member 71 and that of the second outer member 81, respectively.

Finally in Step S7, the inner peripheral surface 72a of the first inner member 72 of the first bearing mounting part 70 and the third and fourth inner peripheral surfaces 82a and 82b of the second inner member 82 of the second bearing mounting part 80 are cut with reference to the positioning holes 6e.

It should be noted that the positioning holes 6e are filled with silicone grease after processing (e.g., in assembling) and are clogged with screws or etc. that anticorrosion processing is executed. Further, the positioning pins 6g are press-inserted into the recesses 6f. The positioning pins 6g are used for positioning the second side cover 6b in attaching the second side cover 6b to the frame 5.

As illustrated in FIG. 2, the pinion gear 32 is a tubular member that the spool shaft 16 penetrates the center part thereof at a predetermined interval. The pinion gear 32 extends from the outside to the inside of the second side plate 5b. The pinion gear 32 is mounted onto the spool shaft 16 while being axially movable. Further, the left end (see FIG. 2) of the pinion gear 32 is supported by the second side plate 5b through a fifth bearing 24e while being rotatable and axially movable. On the other hand, the right end (see FIG. 2) of the pinion gear 32 is supported by the second bearing mounting portion 80 of the second side cover 6b through the third bearing 24c while being rotatable and axially movable. The third and fifth bearings 24c and 24e are both ball bearings.

The pinion gear 32 includes a teeth portion 32a, a meshing portion 32b and a narrowed portion 32c. The teeth portion 32a is formed on the outer periphery of the right end (see FIG. 2) of the pinion gear 32 for meshing with the drive gear 31. The meshing portion 32b is formed on the other end (i.e., the left end in FIG. 2) of the pinion gear 32. The narrowed portion 32c is formed between the teeth portion 32a and the meshing portion 32b. The meshing portion 32b is a recessed groove formed on the end surface of the pinion gear 32 along the diameter of the pinion gear 32. The engaging pin 16b, which is fixed to the spool shaft 16 while penetrating therethrough, is also engaged with the meshing portion 32b. When the pinion gear 32 is herein moved outwards and the engaging pin 16b of the spool shaft 16 is disengaged from the meshing portion 32b of the pinion gear 32, the rotational force from the handle shaft 30 is not transmitted to the spool 12. The clutch mechanism 13 is formed by the meshing portion 32b and the engaging pin 16b.

As illustrated in FIG. 2, the clutch lever 17 is disposed behind the spool 12 while being disposed on the rear part of the space interposed between the pair of the first side plate 5a and the second side plate 5b.

As illustrated in FIG. 2, the clutch engaging/disengaging mechanism 19 includes a clutch yoke 40. The clutch yoke 40 is disposed on the outer peripheral side of the spool shaft 16. The clutch yoke 40 is supported by two pins 41 (only one of the pins 41 is illustrated) while being movable in parallel to the axis of the spool shaft 16. Further, the clutch yoke 40 has an engaging portion 40a on the middle part thereof. The engaging portion 40a is engaged with the narrowed portion 32c of the pinion gear 32. Further, a spring 42 is disposed on the outer periphery of each of the pins 41 supporting the clutch yoke 40 while being disposed between the clutch yoke 40 and the second side cover 6b. The clutch yoke 40 is constantly urged to the clutch-on side by the springs 42.

With the structure, the pinion gear 32 is normally positioned in an inward clutch engaged position. More specifically, the meshing portion 32b of the pinion gear 32 and the engaging pin 16b of the spool shaft 16 are engaged and thus a clutch-on state is produced. On the other hand, when the pinion gear 32 is moved outwards by the clutch yoke 40, the meshing portion 32b and the engaging pin 16b are disengaged from each other and thus a clutch-off state is produced.

The drag mechanism 21 includes a friction plate 45 and a pressure plate 46. The friction plate 45 is configured to be pressed by the drive gear 31. The pressure plate 46 serves to press the friction plate 45 towards the drive gear 31 with predetermined force in conjunction with a rotary operation of the star drag 3.

The casting control mechanism 22 includes a plurality of friction plates 51 and a brake cap 52. The friction plates 51 abut to the both ends of the spool shaft 16 from the axially outside of the spool shaft 20. The brake cap 52 is configured to regulate abutting pressure of the friction plates 51 against the spool shaft 16. The left-side friction plate 51 is attached to the inside of a brake case 65.

As illustrated in FIG. 2, the centrifugal braking mechanism 23 includes a brake member 68, a rotary member 66 and six moving members 67. The brake member 68 is fixed to the brake case 65. The rotary member 66 is fixed to the spool shaft 16 while being concentrically disposed on the inner peripheral side of the brake member 68. The moving members 67 are mounted to the rotary member 66 while being radially movable.

According to the dual-bearing reel with the aforementioned structure, the first and second bearing mounting parts 70 and 80 can be highly accurately formed by cutting the inner peripheral surface 72a of the first inner member 72 of the first bearing mounting part 70 and the third and fourth inner peripheral surfaces 82a and 82b of the second inner member 82 of the second bearing mounting part 80 after the first and second bearing mounting parts 70 and 80 are fixed to the second side cover 6b.

Other Exemplary Embodiments (a) The second side cover 6b of the dual-bearing reel has been exemplified as the fishing component according to the present invention. However, the fishing component is not limited to the second side cover 6b. For example, the present invention can be also applied to a reel unit for an electric reel or a counter reel and a reel unit for a spinning reel.

(b) In the aforementioned exemplary embodiment, the first side cover 6a, the second side cover 6b, the first outer member 71, and the second outer member 81 are made of aluminum alloy whereas the first inner member 72 and the second inner member 82 are made of stainless alloy. However, materials of these members are not limited to the aforementioned metal materials. For example, the second side cover 6b, the first outer member 71 and the second outer member 81 can be made of light metal such as magnesium alloy.

(c) In the aforementioned exemplary embodiment, a chromium plating layer as a corrosion-resistant coating is formed on the surface of the second side cover 6b, whereas an anodized coating as a corrosion-resistant coating is formed on the surface of the first outer member 71 and that of the second outer member 81. However, the corrosion-resistant coatings can not be limited to the above. Alternatively, a layer plated with any other metal and a painted layer can be used as the corrosion-resistant coatings.

(d) In the aforementioned exemplary embodiment, the second inner member 82 has two inner peripheral surfaces, i.e., the third inner peripheral surface 82a that the second bearing 24b is mounted and the fourth inner peripheral surface 82b that the third bearing 24c is mounted. However, the second inner member 82 can have a single inner peripheral surface that a single bearing is mounted. Alternatively, the second inner member 82 can include two inner members, i.e., an inner member having the third inner peripheral surface 82a that the second bearing 24b is mounted and an inner member having the fourth inner peripheral surface 82b that the third bearing 24c is mounted.

(e) In the aforementioned exemplary embodiment, after the first outer member 71 and the second outer member 81 are fixed to the second side cover 6b, the first inner member 72 is mounted and fixed to the first outer member 71 while the second inner member 82 is mounted and fixed to the second outer member 81. However, the first outer member 71 and the second outer member 81 can be fixed to the second side cover 6b after the first inner member 72 is mounted and fixed to the first outer member 71 while the second inner member 82 is mounted and fixed to the second outer member 81.

(f) In the aforementioned exemplary embodiment, the first outer member 71 is swaged to the first opening 6c of the second side cover 6b, while the second outer member 81 is swaged to the second opening 6d of the second side cover 6b. However, the fixation method of these members is not limited to the above. For example, any other suitable fixation methods such as bonding, welding or insert molding can be herein used.

Figure 6:
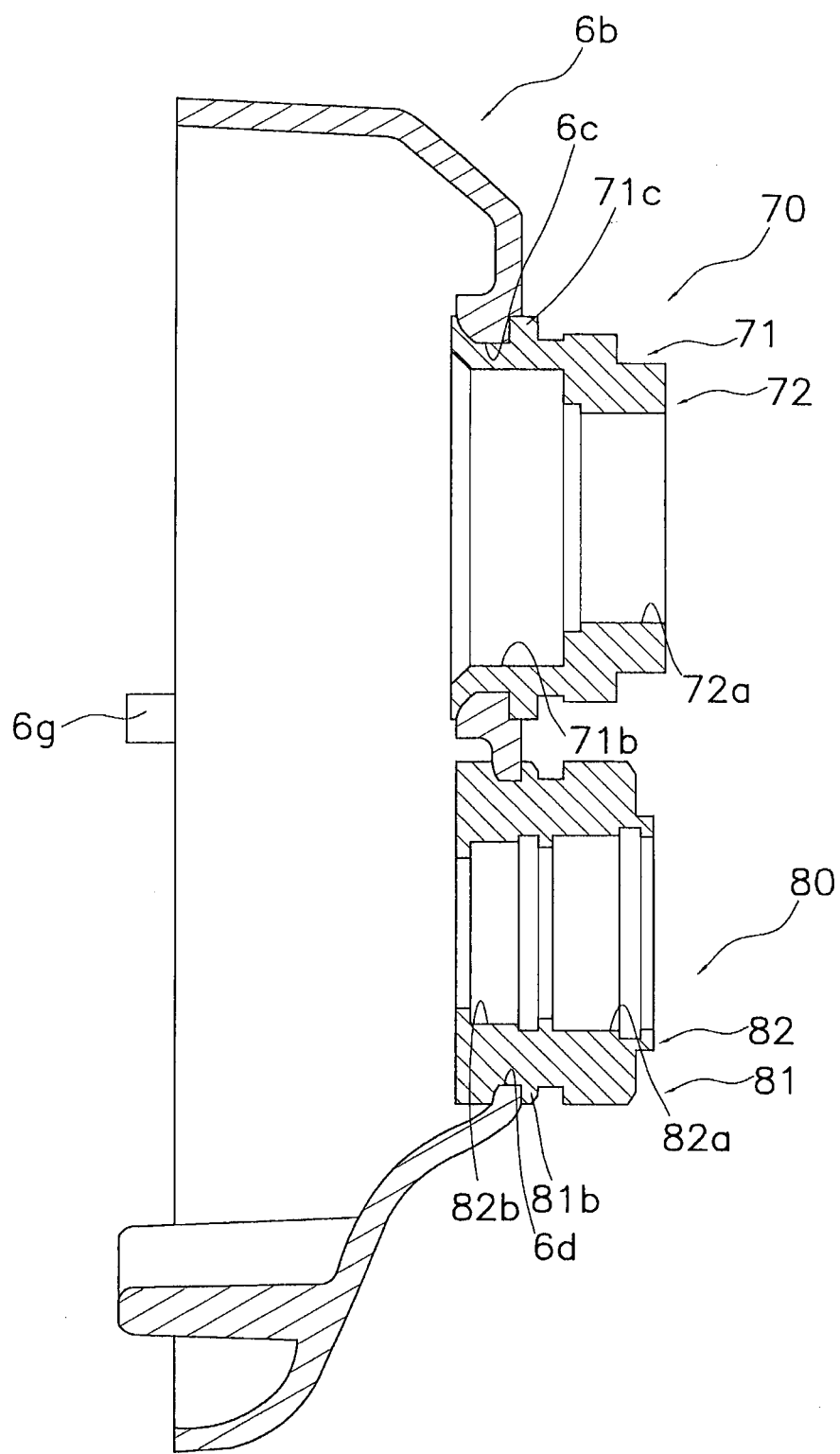
FIG. 6 is a diagram, corresponding to FIG. 4, according to another exemplary embodiment.

(g) In the aforementioned exemplary embodiment, the first inner member 72 and the second inner member 82 are separately mounted and fixed to the inner peripheral surface of the first outer member 71 and that of the second outer member 81. However, as illustrated in FIG. 6, the first inner member 72 can be integrally molded with the first outer member 71 for forming an integrally formed member as the first bearing mounting part 70, while the second inner member 82 can be integrally molded with the second outer member 81 for forming an integrally formed member as the second bearing mounting part 80. It should be herein noted that the first and second bearing mounting parts 70 and 80 in themselves are desirably made of highly corrosion resistive metal material such as stainless alloy.

Advantageous Effects of the Invention

Overall, according to the present invention, in the fishing-reel reel unit, the first inner peripheral surface is formed by machining the first bearing mounting part made of metal after the first bearing mounting part to the first opening. Therefore, the first bearing mounting part can be highly accurately formed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing-reel reel unit, comprising:
a main body member made of metal, the main body including a first opening; and
a first bearing mounting part made of metal, the first bearing mounting part including a first bearing opening, a first inner member having a first inner peripheral surface, and a first outer member, the first opening being configured to accommodate the first bearing mounting part, the first bearing opening being configured to accommodate a first bearing, the first bearing being fixedly mounted on the first inner peripheral surface, the first inner peripheral surface being a machined surface configured to be machined in a state where the first bearing is fixedly mounted in the first opening.

2. The fishing-reel reel unit according to claim 1, wherein at least an outer surface of the main body member is covered with a corrosion-resistant coating formed after the first opening is formed.

3. The fishing-reel reel unit according to one of claim 1, wherein the first inner member is fixedly mounted to an inner periphery of the first outer member.

4. The fishing-reel reel unit according to claim 3, wherein the first outer member is made of light metal and includes a corrosion-resistant coating on a surface thereof, and the first inner member is made of stainless alloy.

5. The fishing-reel reel unit according to claim 1, further comprising a second bearing mounting part made of metal, wherein the main body member includes a second opening disposed away from the first opening, the second bearing mounting part having a second bearing opening, a second inner member having a second inner peripheral surface, and a second outer member, the second opening is configured to accommodate the second bearing mounting part, the second bearing opening is configured to accommodate a second bearing, the second bearing being fixedly mounted on the second inner surface, the second inner peripheral surface is machined in a state where the second bearing mounting part is accommodated in the second opening at a processing position equal to a processing position of the first inner peripheral position when machining the first inner peripheral surface.

6. The fishing-reel reel unit according to claim 5, wherein the second bearing mounting part includes a third inner peripheral surface, the third inner peripheral surface is disposed concentrically to the second inner peripheral surface, and the second bearing opening is configured to accommodate a third bearing at the third inner peripheral surface.

7. The fishing-reel reel unit according to claim 5, wherein the second inner member is fixedly mounted on an inner periphery of the second outer member.

8. The fishing-reel reel unit according to claim 5, wherein the second outer member is made of light metal and includes a corrosion-resistant coating on a surface thereof, and the second inner member is made of stainless alloy.

9. A fishing reel, comprising:

the fishing-reel reel unit according to claim 1.

10. A method of manufacturing a fishing-reel reel unit including a main body member having an opening, the method comprising:

forming the main body member having the opening and a processing reference;

accommodating a bearing mounting part in the opening, the bearing mounting part having a bearing opening and an inner peripheral surface;

accommodating a bearing in the bearing opening, the bearing being fixedly mounted on the inner peripheral surface; and machining the inner peripheral surface of the bearing mounting part where the bearing is fixedly mounted in the bearing opening, based on the processing reference.

11. The method of manufacturing a fishing-reel reel unit according to claim 10, further comprising;

forming a corrosion-resistant coating on the main body member except for the processing reference, wherein the accommodating the bearing mounting part in the opening is performed after the forming the corrosion-resistant coating on the main body member except for the processing reference.

* * * * *